US011609206B2

(12) United States Patent
Niizuma et al.

(10) Patent No.: US 11,609,206 B2
(45) Date of Patent: Mar. 21, 2023

(54) GAS SENSOR

(71) Applicant: NGK INSULATORS, LTD., Aichi (JP)

(72) Inventors: Shotaro Niizuma, Kasugai (JP); Yusuke Watanabe, Nagoya (JP); Toshihiro Hirakawa, Kasugai (JP); Hayami Aota, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 122 days.

(21) Appl. No.: 17/022,184

(22) Filed: Sep. 16, 2020

(65) Prior Publication Data
US 2021/0080421 A1 Mar. 18, 2021

(30) Foreign Application Priority Data

Sep. 17, 2019 (JP) .............................. JP2019-168144

(51) Int. Cl.
G01N 27/406 (2006.01)
G01N 27/407 (2006.01)

(52) U.S. Cl.
CPC ....... G01N 27/4062 (2013.01); G01N 27/407 (2013.01)

(58) Field of Classification Search
CPC ............. G01N 27/404; G01N 27/4062; G01N 27/407; G01N 27/4074; G01N 27/409; G01N 27/419; G01N 27/41; G01N 33/004; G01N 33/0036–0054; F01D 17/12; F01D 3/04; F02D 41/1483; F02D 41/1461; F02D 41/1474; F02D 41/146; F02D 41/1455; F02D 41/14951; F02D 41/1496; F02D 41/1494; F02D 41/1444; F02D 41/30
See application file for complete search history.

(56) References Cited

U.S. PATENT DOCUMENTS

2007/0052862 A1* 3/2007 Matsuo ................ G01N 27/407 348/669
2018/0011047 A1 1/2018 Oba et al.

FOREIGN PATENT DOCUMENTS

JP 2001-141689 A 5/2001
JP 2018-13475 A 1/2018

OTHER PUBLICATIONS

Unexamined U.S. Appl. No. 17/022,194, filed Sep. 16, 2020.
German Office Action received in corresponding German Application No. 10 2020 005 664.4 dated Sep. 1, 2022.
Japanese Notification of Submission of Publication received in corresponding Japanese Application No. 2019-168144 dated Aug. 30, 2022 w/partial translation.

* cited by examiner

Primary Examiner — Gurpreet Kaur
(74) Attorney, Agent, or Firm — Mattingly & Malur, PC

(57) ABSTRACT

A gas sensor includes: a sensor element; a plurality of element pads formed on a rear end portion of the sensor element; and a plurality of contact members holding the rear end portion of the sensor element and electrically connected respectively to the plurality of element pads. At least one contact member of the plurality of contact members has an end portion having a smaller width Wt than the other contact members.

2 Claims, 4 Drawing Sheets

GAS TO BE MEASURED →

FIG. 4

[TABLE 1]

| | RATIO (%) OF WIDTH Wt TO WIDTH OF OUTER CONTACT MEMBERS | RATIO (%) OF WIDTH Wt TO WIDTH W OF SENSOR ELEMENT | JUDGMENT 1 | JUDGMENT 2 |
|---|---|---|---|---|
| COMPARATIVE EXAMPLE 1 | 100 | 30.3 | B | A |
| EXAMPLE 1 | 90 | 27.3 | A | A |
| EXAMPLE 2 | 80 | 24.2 | A | A |
| EXAMPLE 3 | 70 | 21.2 | A | A |
| EXAMPLE 4 | 60 | 18.2 | A | A |
| EXAMPLE 5 | 50 | 15.2 | A | A |
| EXAMPLE 6 | 45 | 13.6 | A | A |
| EXAMPLE 7 | 40 | 12.1 | A | A |
| COMPARATIVE EXAMPLE 2 | 35 | 10.6 | B | A |
| COMPARATIVE EXAMPLE 3 | 30 | 9.1 | B | B |

GAS SENSOR

CROSS-REFERENCE TO RELATED APPLICATION

This application is based upon and claims the benefit of priority from Japanese Patent Application No. 2019-168144 filed on Sep. 17, 2019, the contents of which are incorporated herein by reference.

BACKGROUND OF THE INVENTION

Field of the Invention

The present invention relates to a gas sensor.

Description of the Related Art

The technique disclosed in Japanese Laid-Open Patent Publication No. 2001-141689 has an object to provide a gas sensor that is less prone to short-circuiting of lead wires, metal terminal members, etc. and that provides stable sensor output.

In order to achieve the object, the technique disclosed in Japanese Laid-Open Patent Publication No. 2001-141689 includes first guide portions (531) formed at the front ends of individual first through holes in an elastic insulating member (5), and second guide portions (331) formed at the proximal ends of individual second through holes in an insulator (3), where the first guide portions (531) and the second guide portions (331) restrict movement of lead wires (161) and metal terminals (49).

SUMMARY OF THE INVENTION

According to the gas sensor described in Japanese Laid-Open Patent Publication No. 2001-141689, a plurality of contact members (female contacts), which are in direct contact with the sensor element to provide conduction, have the same widths. The distance between adjacent contact members hence becomes smaller as the width of the contact members is larger, resulting in the increased possibility of short-circuiting.

Furthermore, in gas sensors for use in vehicles, a larger width of a contact member increases the area of the element pad that is paired with the contact member, so that the amount of material used to form the element pad, e.g., Pt (platinum) is increased, leading to increased cost.

The present invention has been devised considering these problems, and an object of the present invention is to provide a gas sensor capable of solving the above problems, i.e., capable of preventing occurrence of short-circuiting between adjacent contact members and reducing the amount of material used to form element pads.

A gas sensor according to one aspect of the present invention includes:

a sensor element;

a plurality of element pads formed on a rear end portion of the sensor element; and a plurality of contact members configured to hold the rear end portion of the sensor element and be electrically connected respectively to the plurality of element pads, wherein at least one contact member of the plurality of contact members has a smaller width than the other contact members of the plurality of contact members.

According to the present invention, it is possible to prevent short-circuiting from occurring between adjacent contact members and to reduce the amount of material used to form the element pads.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is Table 1 showing the results of evaluation of examples 1 to 7 and comparative examples 1 to 3.

DESCRIPTION OF THE PREFERRED EMBODIMENTS

The gas sensor according to the present invention will be described below in detail in connection with preferred embodiments while referring to the accompanying drawings.

Figure 1:
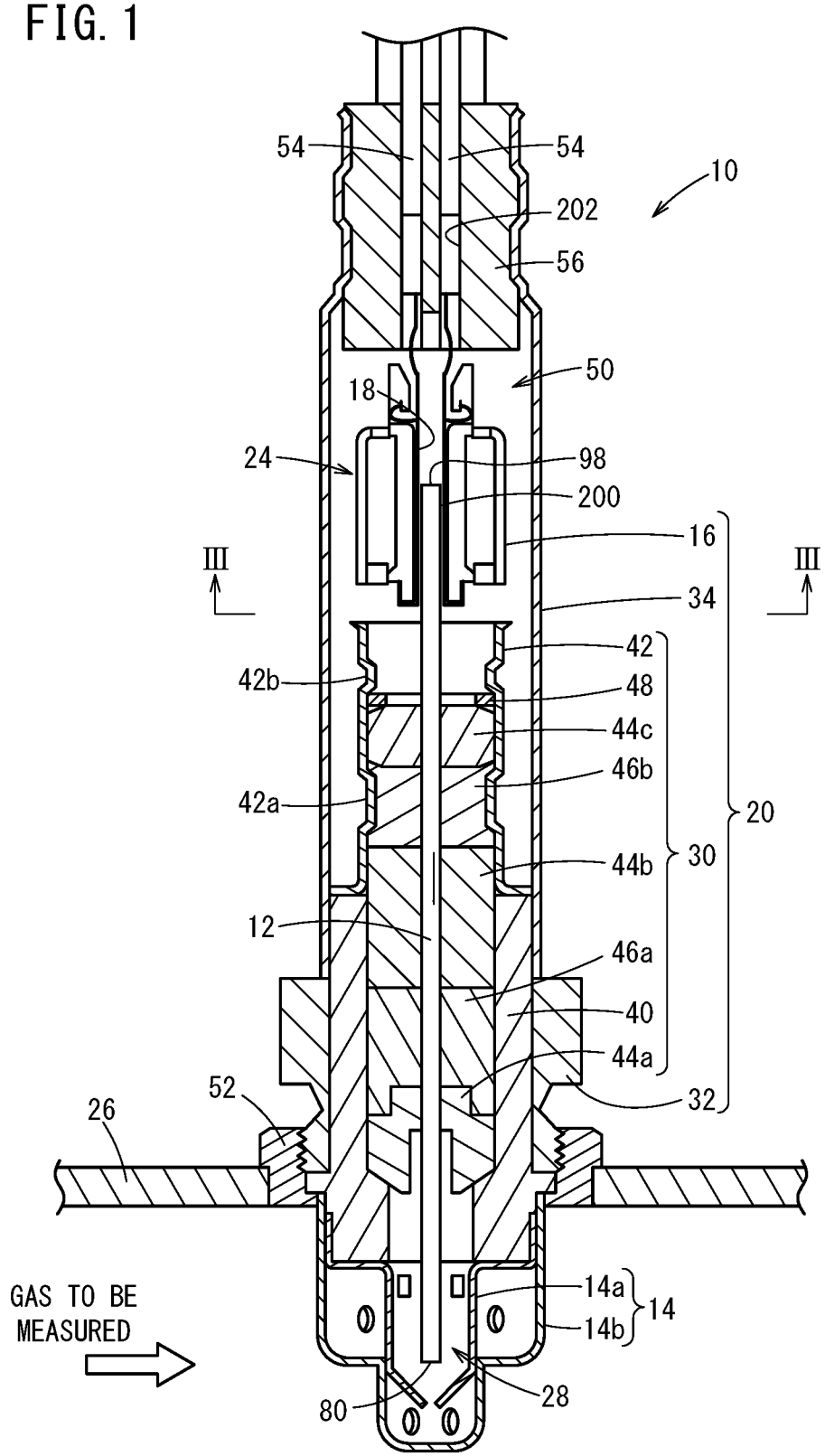
FIG. 1 is a cross section of a gas sensor according to an embodiment.

As shown in FIG. 1, a gas sensor 10 according to this embodiment includes a sensor element 12. The sensor element 12 has an elongated rectangular parallelepiped shape. The longitudinal direction of the sensor element 12 (the left-right direction in FIG. 2) is defined as a front-rear direction, and the thickness direction of the sensor element 12 (the top-bottom direction in FIG. 2) is defined as a top-bottom direction. The width direction of the sensor element 12 (a direction vertical to the front-rear and top-bottom directions) is defined as a left-right direction.

As shown in FIG. 1, the gas sensor 10 includes the sensor element 12, a protective cover 14 for protecting the front end of the sensor element 12, and a sensor assembly 20 including a ceramic housing 16. The ceramic housing 16 holds a rear end portion of the sensor element 12, and functions as a connector 24 by terminal members 18 electrically connected to the sensor element 12 being attached thereto.

As shown in the drawing, the gas sensor 10 is attached to piping 26, such as an exhaust gas pipe of a vehicle, for example, and used to measure concentrations of specific gases, such as NOx, $O_2$, etc., that are contained in the exhaust gas, which is a gas to be measured (which will be also referred to as a measured gas).

The protective cover 14 includes a bottomed-tubular-shaped inner protective cover 14a covering the front end of the sensor element 12 and a bottomed-tubular-shaped outer protective cover 14b covering the inner protective cover 14a. The inner protective cover 14a and the outer protective cover 14b have formed therein a plurality of holes through which gas to be measured can flow into the interior of the protective cover 14. A sensor element chamber 28 is formed as a space enclosed by the inner protective cover 14a, and the front end of the sensor element 12 is disposed within the sensor element chamber 28.

The sensor assembly 20 includes an element seal body 30 for sealing and fixing the sensor element 12, a nut 32 attached to the element seal body 30, an outer tube 34, and the connector 24. The connector 24 is in contact with and electrically connected to electrodes (not shown) that are formed on the surfaces (top and bottom surfaces) of the rear end of the sensor element 12.

The element seal body 30 includes a tubular main fitting 40, and a tubular, inner tube 42 that is welded and fixed coaxially with the main fitting 40. The element seal body 30 includes ceramic supporters 44a to 44c, green compacts (pressurized powder body) 46a, 46b, and a metal ring 48, which are sealed in an inner through hole in the interior of the main fitting 40 and the inner tube 42. The sensor element 12 is located on the center axis of the element seal body 30 and penetrates through the element seal body 30 in the front-rear direction. The inner tube 42 has a reduced-diameter portion 42a and a reduced-diameter portion 42b. The reduced-diameter portion 42a presses the green compact 46b toward the center axis of the inner tube 42. The reduced-diameter portion 42b presses frontward the ceramic supporters 44a to 44c and the green compacts 46a, 46b through the metal ring 48. The pressing forces from the reduced-diameter portions 42a, 42b compress the green compacts 46a, 46b between the main fitting 40 and inner tube 42 and the sensor element 12. The green compacts 46a, 46b thus provide a seal between the sensor element chamber 28 in the protective cover 14 and a space 50 in the outer tube 34 and fix the sensor element 12.

The nut 32 is fixed coaxially with the main fitting 40, and has a male thread portion formed on its outer peripheral surface. The male thread portion of the nut 32 is inserted in a fixing member 52 that is welded to the piping 26 and has a female thread formed on its inner peripheral surface. The gas sensor 10 is thus fixed to the piping 26 with the front end of the sensor element 12 and the protective cover 14 projecting into the piping 26.

The outer tube 34 encloses the inner tube 42, the sensor element 12, and the connector 24. A plurality of lead wires 54 connected to the connector 24 are led out from the rear end of the outer tube. The lead wires 54 electrically conduct through the connector 24 to electrodes of the sensor element 12 (which will be described later). The gap between the outer tube 34 and the lead wires 54 is sealed by an elastic insulating member 56 formed from grommet or the like. The space 50 in the outer tube 34 is filled with a reference gas (the air in this embodiment). The rear end of the sensor element 12 is disposed within this space 50.

Figure 2:
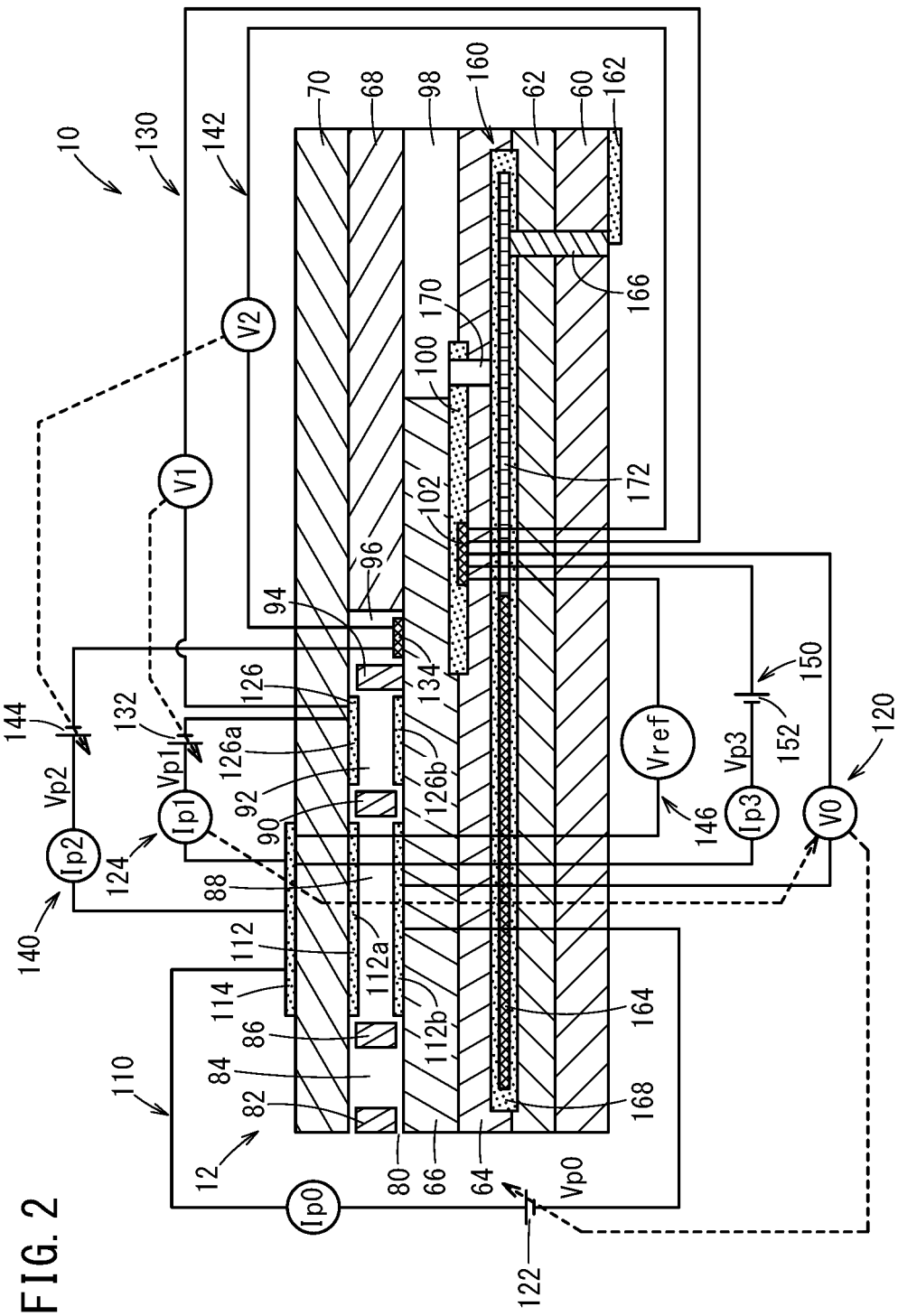
FIG. 2 is a schematic cross section schematically showing an exemplary configuration of a sensor element.

On the other hand, as shown in FIG. 2, the sensor element 12 is a device formed of a laminate in which six layers, for example, are laminated in this order from the bottom in the drawing. The six layers include a first substrate layer 60, a second substrate layer 62, a third substrate layer 64, a first solid electrolyte layer 66, a spacer layer 68, and a second solid electrolyte layer 70. The six layers are each formed of an oxygen ion conducting solid electrolyte layer, such as zirconia ($ZrO_2$), for example. In addition, the solid electrolyte forming the six layers is dense and gas-tight. The sensor element 12 is produced, for example, by applying given processing to, and printing circuit patterns on, ceramic green sheets corresponding to the respective layers, laminating these sheets together, and then integrating the sheets by sintering.

A plurality of diffusion control portions and a plurality of internal cavities, which will be described next, are formed between the lower surface of the second solid electrolyte layer 70 and the upper surface of the first solid electrolyte layer 66, on the side of one end of the sensor element 12 (on the left side in FIG. 2). That is, a gas inlet 80, a first diffusion control portion 82, a buffer space 84, a second diffusion control portion 86, a first internal cavity 88, a third diffusion control portion 90, a second internal cavity 92, a fourth diffusion control portion 94, and a third internal cavity 96 are formed in such a manner that they communicate and adjoin in this order.

The gas inlet 80, the buffer space 84, the first internal cavity 88, the second internal cavity 92, and the third internal cavity 96 are formed by hollowing out the spacer layer 68. Each of the buffer space 84 and others is a space in the sensor element 12 that is sectioned by the lower surface of the second solid electrolyte layer 70 at the top, the upper surface of the first solid electrolyte layer 66 at the bottom, and the side surfaces of the spacer layer 68 on the sides.

The first diffusion control portion 82, the second diffusion control portion 86, and the third diffusion control portion 90 are each formed as two horizontally-long slits (the openings thereof have their longitudinal direction in the direction vertical to the drawing sheet). The fourth diffusion control portion 94 is formed as one horizontally-long slit, which is formed as a gap below the lower surface of the second solid electrolyte layer 70 (the opening thereof has its longitudinal direction in the direction vertical to the drawing sheet). The section from the gas inlet 80 to the third internal cavity 96 will be referred to also as a measured gas passage.

A reference gas introduction space 98 is provided in a position separated farther from the above-mentioned one end, than the measured gas passage. The reference gas introduction space 98 is formed between the upper surface of the third substrate layer 64 and the lower surface of the spacer layer 68 and is sectioned by a side surface of the first solid electrolyte layer 66 on the side. A reference gas for the measurement of NOx concentration, e.g., the air (the atmosphere within the space 50 in FIG. 1), is introduced into the reference gas introduction space 98.

An atmosphere introduction layer 100 is a layer made of ceramic such as porous alumina etc. and is exposed in the reference gas introduction space 98. Reference gas is introduced to the atmosphere introduction layer 100 through the reference gas introduction space 98. The atmosphere introduction layer 100 is formed so as to cover a reference electrode 102. The atmosphere introduction layer 100 introduces the reference gas in the reference gas introduction space 98 to the reference electrode 102 while providing a given diffusion resistance to the reference gas. The atmosphere introduction layer 100 is formed in such a manner that it is exposed to the interior of the reference gas introduction space 98 only on a rear end side of the sensor element 12 that lies rearward of the reference electrode 102 (on the right side in FIG. 2). In other words, the reference gas introduction space 98 is not formed to a position right above the reference electrode 102. However, the reference electrode 102 may be formed right below the reference gas introduction space 98 in FIG. 2.

The reference electrode 102 is an electrode that is formed between the upper surface of the third substrate layer 64 and the first solid electrolyte layer 66, and, as mentioned above, the atmosphere introduction layer 100 connecting to the reference gas introduction space 98 is provided around it. The reference electrode 102 is formed directly on the upper surface of the third substrate layer 64 and is covered by the atmosphere introduction layer 100 except in portions contacting the upper surface of the third substrate layer 64. Also, as will be described later, it is possible to measure the oxygen concentrations (oxygen partial pressures) in the first internal cavity 88, the second internal cavity 92, and the third internal cavity 96, by using the reference electrode 102.

The reference electrode 102 is formed as a porous cermet electrode (e.g., a cermet electrode of Pt and $ZrO_2$).

In the measured gas passage, the gas inlet 80 is opened to the outside space, and the measured gas is taken into the sensor element 12 from the outside space through the gas inlet 80. The first diffusion control portion 82 is a portion that provides a given diffusion resistance to the measured gas taken from the gas inlet 80. The buffer space 84 is a space that guides the measured gas introduced from the first diffusion control portion 82 to the second diffusion control portion 86.

The second diffusion control portion 86 is a portion that provides a given diffusion resistance to the measured gas guided from the buffer space 84 into the first internal cavity 88. Now, a case will be described in which the measured gas is introduced from the outside of the sensor element 12 into the first internal cavity 88 by pressure fluctuation of the measured gas in the outside space. The pressure fluctuation can be caused by exhaust pressure pulsation if the measured gas is an automotive exhaust gas. The measured gas rapidly taken into the sensor element 12 from the gas inlet 80 due to pressure fluctuation is not directly introduced into the first internal cavity 88. Concentration variation of the measured gas is cancelled through the first diffusion control portion 82, the buffer space 84, and the second diffusion control portion 86, and then the measured gas is introduced into the first internal cavity 88.

Accordingly, the concentration variation of the measured gas introduced into the first internal cavity 88 has become almost negligible. The first internal cavity 88 is a space that adjusts the oxygen partial pressure in the measured gas introduced through the second diffusion control portion 86. The oxygen partial pressure is adjusted by operation of a main pump cell 110 described next.

The main pump cell 110 is an electrochemical pump cell formed of an inside pumping electrode 112, an outside pumping electrode 114, and the second solid electrolyte layer 70. The inside pumping electrode 112 is provided on the internal surfaces of the first internal cavity 88. The outside pumping electrode 114 is formed on a portion of the upper surface of the second solid electrolyte layer 70 that corresponds to the inside pumping electrode 112 in such a manner that it is exposed to the outside space (the sensor element chamber 28 in FIG. 1). The second solid electrolyte layer 70 is sandwiched between the inside pumping electrode 112 and the outside pumping electrode 114.

The inside pumping electrode 112 is formed on the upper and lower solid electrolyte layers (the second solid electrolyte layer 70 and the first solid electrolyte layer 66) that section the first internal cavity 88, and on the spacer layer 68 that forms the side walls. Specifically, a ceiling electrode portion 112a of the inside pumping electrode 112 is formed on the lower surface of the second solid electrolyte layer 70 forming the ceiling surface of the first internal cavity 88. A bottom electrode portion 112b is formed directly on the upper surface of the first solid electrolyte layer 66 forming the bottom surface of the first internal cavity 88. Side electrode portions (not shown) are formed on the side wall surfaces (internal surfaces) of the spacer layer 68 forming both side walls of the first internal cavity 88, such that the side electrode portions connect the ceiling electrode portion 112a and the bottom electrode portion 112b. That is, the inside pumping electrode 112 is formed as a structure of a tunnel shape.

The inside pumping electrode 112 and the outside pumping electrode 114 are formed as porous cermet electrodes (e.g., cermet electrodes of Pt and $ZrO_2$ containing 1% Au).

The inside pumping electrode 112 that contacts the measured gas is formed from a material with a weakened reduction capability to NOx components in the measured gas.

In the main pump cell 110, a desired pumping voltage Vp0 is applied across the inside pumping electrode 112 and the outside pumping electrode 114 to cause a pumping current Ip0 to flow in the positive direction or negative direction between the inside pumping electrode 112 and the outside pumping electrode 114. This enables the main pump cell 110 to pump out the oxygen in the first internal cavity 88 to the outside space, or to pump the oxygen in the outside space into the first internal cavity 88.

The sensor element 12 further includes a main-pump-controlling oxygen-partial-pressure-detecting sensor cell 120 for detecting the oxygen concentration (oxygen partial pressure) in the atmosphere in the first internal cavity 88. This sensor cell 120 is an electrochemical sensor cell including the inside pumping electrode 112, the second solid electrolyte layer 70, the spacer layer 68, the first solid electrolyte layer 66, and the reference electrode 102.

The oxygen concentration (oxygen partial pressure) in the first internal cavity 88 is known by measuring an electromotive force V0 in the main-pump-controlling oxygen-partial-pressure-detecting sensor cell 120. Further, the pumping current Ip0 is controlled by feedback controlling the pumping voltage Vp0 of a variable power supply 122 so as to keep the electromotive force V0 constant. The oxygen concentration in the first internal cavity 88 can thus be maintained at a certain constant value.

The third diffusion control portion 90 is a portion that provides a given diffusion resistance to the measured gas whose oxygen concentration (oxygen partial pressure) has been controlled by the operation of the main pump cell 110 in the first internal cavity 88, and that guides the gas to be measured, into the second internal cavity 92.

The second internal cavity 92 is provided as a space in which the measured gas, which has undergone oxygen concentration (oxygen partial pressure) adjustment in the first internal cavity 88 and is then introduced to the space through the third diffusion control portion 90, is subjected to further oxygen partial pressure adjustment by an auxiliary pump cell 124. The oxygen concentration in the second internal cavity 92 can thus be kept constant highly accurately, enabling the gas sensor 10 to perform highly accurate NOx concentration measurement.

The auxiliary pump cell 124 is an auxiliary electrochemical pump cell including an auxiliary pumping electrode 126 provided on the inner surfaces of the second internal cavity 92, the outside pumping electrode 114, and the second solid electrolyte layer 70. A suitable electrode outside of the sensor element 12 suffices as the outside pumping electrode 114.

The auxiliary pumping electrode 126 has a tunnel-shaped structure similar to that of the inside pumping electrode 112 provided in the first internal cavity 88 and is disposed in the second internal cavity 92. That is, a ceiling electrode portion 126a is formed on the second solid electrolyte layer 70 forming the ceiling surface of the second internal cavity 92. Also, a bottom electrode portion 126b is formed directly on the upper surface of the first solid electrolyte layer 66 forming the bottom surface of the second internal cavity 92. Then, side electrode portions (not shown) connecting the ceiling electrode portion 126a and the bottom electrode portion 126b are formed on both wall surfaces of the spacer layer 68 forming the side walls of the second internal cavity 92, thus forming a tunnel-shaped structure. Like the inside pumping electrode 112, the auxiliary pumping electrode 126 is also made of a material having a weakened reduction capability to NOx components in the measured gas.

In the auxiliary pump cell 124, a desired voltage Vp1 is applied across the auxiliary pumping electrode 126 and the outside pumping electrode 114 so as to pump out the oxygen in the atmosphere in the second internal cavity 92 to the outside space, or to pump oxygen into the second internal cavity 92 from the outside space.

Further, in order to control the oxygen partial pressure in the atmosphere in the second internal cavity 92, an electrochemical sensor cell, i.e., an auxiliary-pump-controlling oxygen-partial-pressure-detecting sensor cell 130, is formed of the auxiliary pumping electrode 126, the reference electrode 102, the second solid electrolyte layer 70, the spacer layer 68, and the first solid electrolyte layer 66.

The auxiliary pump cell 124 performs pumping with a variable power supply 132 that is voltage-controlled based on an electromotive force V1 detected by the auxiliary-pump-controlling oxygen-partial-pressure-detecting sensor cell 130. Thus, the oxygen partial pressure in the atmosphere in the second internal cavity 92 can be controlled to such low partial pressure as not to substantially affect the measurement of NOx.

In addition, a pumping current Ip1 thereof is used to control the electromotive force V0 of the main-pump-controlling oxygen-partial-pressure-detecting sensor cell 120. Specifically, the pumping current Ip1 is inputted as a control signal to the main-pump-controlling oxygen-partial-pressure-detecting sensor cell 120 to thereby control the electromotive force V0. A control is thus provided so that the gradient of oxygen partial pressure in the measured gas introduced from the third diffusion control portion 90 into the second internal cavity 92 can always be kept constant. When the gas sensor is used as a NOx sensor, the main pump cell 110 and the auxiliary pump cell 124 can operate to keep the oxygen concentration in the second internal cavity 92 at a constant value around about 0.001 ppm.

The fourth diffusion control portion 94 is a portion that provides a given diffusion resistance to the measured gas whose oxygen concentration (oxygen partial pressure) has been controlled in the second internal cavity 92 by the operation of the auxiliary pump cell 124, and that guides the measured gas into the third internal cavity 96. The fourth diffusion control portion 94 serves to limit the amount of NOx flowing into the third internal cavity 96.

The measured gas, whose oxygen concentration (oxygen partial pressure) has been adjusted in the second internal cavity 92, is introduced into the third internal cavity 96 through the fourth diffusion control portion 94. That is, the third internal cavity 96 is provided as a space in which the measured gas introduced therein is subjected to a process for the measurement of concentration of nitrogen oxide (NOx) in the measured gas. The measurement of NOx concentration is mainly performed in the third internal cavity 96 by operation of a measurement pump cell 140.

The measurement pump cell 140 measures the NOx concentration in the measured gas in the third internal cavity 96. The measurement pump cell 140 is an electrochemical pump cell formed of a measurement electrode 134 formed directly on the upper surface of the first solid electrolyte layer 66 facing the third internal cavity 96, the outside pumping electrode 114, the second solid electrolyte layer 70, the spacer layer 68, and the first solid electrolyte layer 66. The measurement electrode 134 is a porous cermet electrode. The measurement electrode 134 functions also as a NOx reduction catalyst that reduces the NOx present in the atmosphere in the third internal cavity 96.

In the measurement pump cell 140, the oxygen generated by the decomposition of nitrogen oxide in the atmosphere around the measurement electrode 134 is pumped out, and the amount of the generated oxygen can be detected as a pumping current Ip2.

Further, in order to detect the oxygen partial pressure around the measurement electrode 134, an electrochemical sensor cell, i.e., a measurement-pump-controlling oxygen-partial-pressure-detecting sensor cell 142, is formed of the first solid electrolyte layer 66, the measurement electrode 134, and the reference electrode 102. A variable power supply 144 is controlled based on an electromotive force V2 detected by the measurement-pump-controlling oxygen-partial-pressure-detecting sensor cell 142.

The measured gas guided into the second internal cavity 92 reaches the measurement electrode 134 in the third internal cavity 96 through the fourth diffusion control portion 94 in a state that an oxygen partial pressure is controlled. The nitrogen oxide in the measured gas around the measurement electrode 134 is reduced to generate oxygen ($2NO \rightarrow N_2+O_2$). Then, the oxygen generated is pumped by the measurement pump cell 140. In this process, a voltage Vp2 of the variable power supply 144 is controlled so that the electromotive force V2 detected by the measurement-pump-controlling oxygen-partial-pressure-detecting sensor cell 142 is kept constant. The amount of oxygen generated around the measurement electrode 134 is proportional to the concentration of the nitrogen oxide in the measured gas. Accordingly, the nitrogen oxide concentration in the measured gas is calculated using the pumping current Ip2 of the measurement pump cell 140.

Further, an electrochemical sensor cell 146 is formed of the second solid electrolyte layer 70, the spacer layer 68, the first solid electrolyte layer 66, the third substrate layer 64, the outside pumping electrode 114, and the reference electrode 102. The oxygen partial pressure in the measured gas outside of the sensor can be detected by an electromotive force Vref obtained by the sensor cell 146.

Further, an electrochemical reference-gas-adjustment pump cell 150 is formed of the second solid electrolyte layer 70, the spacer layer 68, the first solid electrolyte layer 66, the third substrate layer 64, the outside pumping electrode 114, and the reference electrode 102. The reference-gas-adjustment pump cell 150 performs pumping as a voltage Vp3 applied by a variable power supply 152 connected between the outside pumping electrode 114 and the reference electrode 102 causes a control current Ip3 to flow. The reference-gas-adjustment pump cell 150 thus pumps oxygen into a space (atmosphere introduction layer 100) around the reference electrode 102 from another space (the sensor element chamber 28 in FIG. 1) around the outside pumping electrode 114. The voltage Vp3 of the variable power supply 152 is predetermined as such a direct-current (DC) voltage that the control current Ip3 has a given value (a DC current with a constant value).

In the gas sensor 10 constructed as described above, the main pump cell 110 and the auxiliary pump cell 124 are operated so that the measurement pump cell 140 is supplied with the measured gas in which the oxygen partial pressure is always kept at a constant low value. The constant low value of oxygen partial pressure means a value that does not substantially affect the NOx measurement. Thus, the NOx concentration in the measured gas can be known based on the pumping current Ip2 that flows in substantially proportion to the NOx concentration in the measured gas as the oxygen generated by NOx reduction is pumped out by the measurement pump cell 140.

The sensor element 12 further includes a heater unit 160 that serves as a temperature controller by heating the sensor element 12 and keeping the temperature, in order to enhance the oxygen ion conductivity of the solid electrolyte. The heater unit 160 includes a heater connector electrode 162, a heater 164, a through hole 166, a heater insulating layer 168, a pressure release hole 170, and a lead wire 172.

The heater connector electrode 162 is an electrode that is formed in contact with the lower surface of the first substrate layer 60. The heater connector electrode 162 is connected to an external power supply to supply electricity to the heater unit 160 from outside.

The heater 164 is an electric resistor that is sandwiched between the second substrate layer 62 therebelow and the third substrate layer 64 thereabove. The heater 164 is connected to the heater connector electrode 162 through the lead wire 172 and the through hole 166. The heater 164 generates heat by being supplied with electricity from outside through the heater connector electrode 162, thereby heating the solid electrolyte forming the sensor element 12 and keeping it hot or warm.

Further, the heater 164 is buried in the entire area from the first internal cavity 88 to the third internal cavity 96, so that the entire sensor element 12 can be adjusted to temperatures at which the solid electrolyte is activated.

The heater insulating layer 168 is an insulating layer formed on the upper and lower surfaces of the heater 164, and it is made of porous alumina formed of an insulator of alumina etc. The heater insulating layer 168 is formed for the purpose of obtaining electric insulation between the second substrate layer 62 and the heater 164 and electric insulation between the third substrate layer 64 and the heater 164.

The pressure release hole 170 penetrates through the third substrate layer 64 to communicate with the reference gas introduction space 98, in order to reduce internal pressure increase caused by temperature rise in the heater insulating layer 168.

The variable power supplies 122, 144, 132, 152, etc. shown in FIG. 2 are actually connected to electrodes through lead wires (not shown) formed in the sensor element 12 and the connector 24 and lead wires 54 in FIG. 1.

Figure 3:
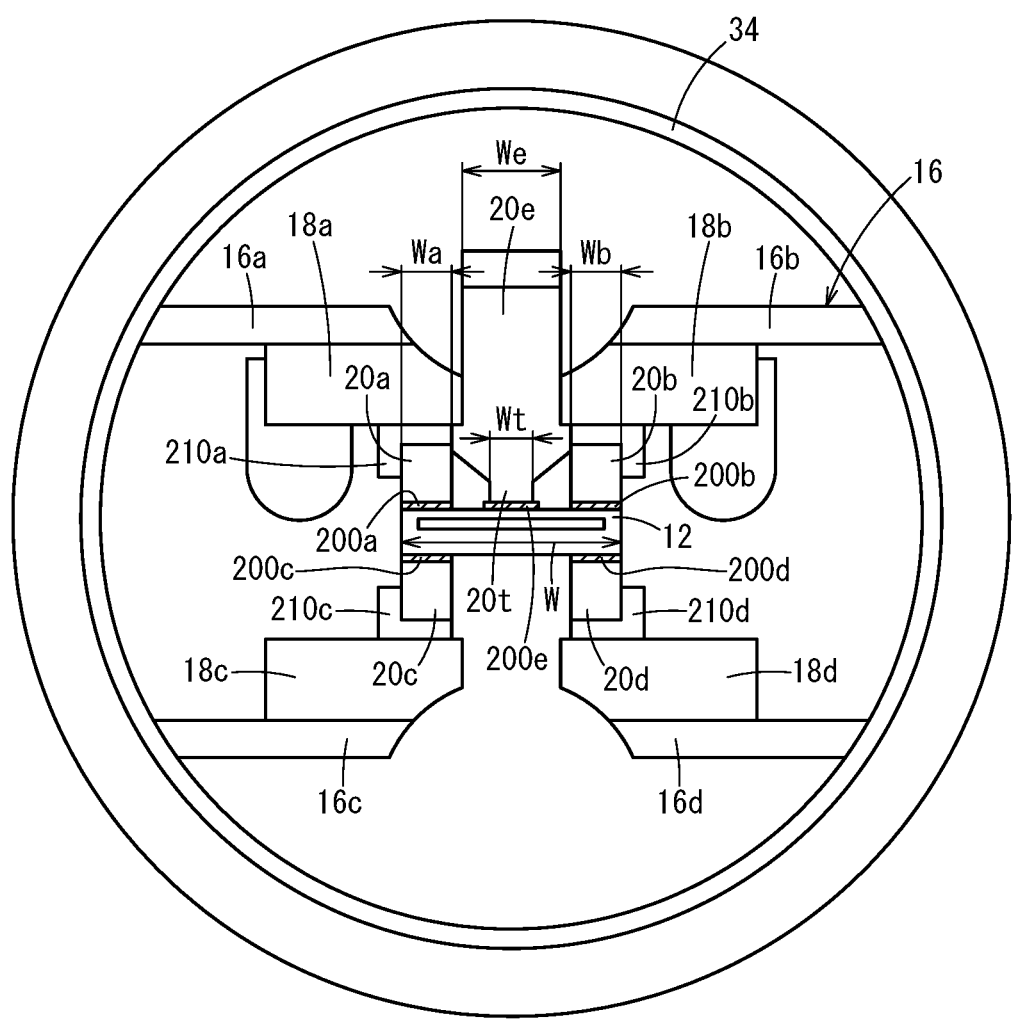
FIG. 3 is the cross section taken along line III-III in FIG. 1.

Now, in this embodiment, the terminal members 18 extending rearward are electrically connected to element pads 200 that are exposed at the rear end portion of the sensor element 12. The ceramic housing 16 is provided around the rear end portion of the sensor element 12. The terminal members 18 are fitted between the element pads 200 and the ceramic housing 16, whereby the element pads 200 of the sensor element 12 and the terminal members 18 are press fitted (crimped) and then electrically connected together. That is, the ceramic housing 16 is provided with the terminal members 18 electrically connected to the sensor element 12 and holds the rear end portion of the sensor element 12. As shown in FIG. 3, the element pads 200 include a first element pad 200a, a second element pad 200b, a third element pad 200c, a fourth element pad 200d, and a fifth element pad 200e. Also, as shown in FIG. 3, the terminal members 18 include a first terminal member 18a, a second terminal member 18b, a third terminal member 18c, and a fourth terminal member 18d.

The rear ends of the terminal members 18 extend rearward beyond the rear portion of the ceramic housing 16 and are electrically connected, by soldering etc., to the lead wires 54 inserted into the elastic insulating member 56. The elastic insulating member 56 has formed therein a plurality of through holes 202 along the axial direction of the sensor element 12. The lead wires 54 are inserted through the through holes 202, and the terminal members 18 extending from the sensor element 12 and the lead wires 54 are electrically connected by soldering etc.

In particular, as shown in FIG. 3, the gas sensor 10 of this embodiment includes the four terminal members 18 (first to fourth terminal members 18a to 18d) on the inside of the ceramic housing 16 extending in the front-rear direction inside the outer tube 34.

The ceramic housing 16 includes two ceramic pieces (a first ceramic piece 16a and a second ceramic piece 16b) that inwardly face each other, and the other two ceramic pieces (a third ceramic piece 16c and a fourth ceramic piece 16d) that inwardly face each other. The first terminal member 18a and the second terminal member 18b are provided respectively on the two ceramic pieces. Further, the third terminal member 18c and the fourth terminal member 18d are provided respectively on the other two ceramic pieces.

The first ceramic piece 16a and second ceramic piece 16b, and the third ceramic piece 16c and fourth ceramic piece 16d, are provided in the housing 16 in such a manner that they face each other.

Further, a first contact member 20a is provided on one main surface of the first terminal member 18a (a surface facing toward the third terminal member 18c), with a first positioning layer 210a interposed therebetween. More specifically, the first contact member 20a is disposed at a position that faces the first element pad 200a formed on one main surface of the sensor element 12. A second contact member 20b is provided on one main surface of the second terminal member 18b (a surface facing toward the fourth terminal member 18d), with a second positioning layer 210b interposed therebetween. More specifically, the second contact member 20b is disposed at a position that faces the second element pad 200b formed on the one main surface of the sensor element 12.

Similarly, a third contact member 20c is provided on one main surface of the third terminal member 18c (a surface facing toward the first terminal member 18a), with a third positioning layer 210c interposed therebetween. More specifically, the third contact member 20c is disposed at a position that faces the third element pad 200c formed on the other main surface of the sensor element 12, for example on the left side. A fourth contact member 20d is provided on one main surface of the fourth terminal member 18d (a surface facing toward the second terminal member 18b), with a fourth positioning layer 210d interposed therebetween. More specifically, the fourth contact member 20d is disposed at a position that faces the fourth element pad 200d formed on the other main surface of the sensor element 12.

Further, a fifth contact member 20e is provided between the first terminal member 18a and the second terminal member 18b. A width We of the fifth contact member 20e, excluding a width Wt of its end portion 20t, is approximately twice the width (Wa, Wb, etc.) of the first contact member 20a etc. On the other hand, the width Wt of the end portion 20t is formed narrower than the width (Wa, Wb, etc.) of the first contact member 20a etc. The fifth contact member 20e is positioned so that the end portion 20t faces the fifth element pad 200e formed on the one main surface of the sensor element 12.

Then, it is preferred that the width Wt of the end portion 20t of the fifth contact member 20e is greater than or equal to 40% and less than or equal to 90% of the widths (Wa, Wb, etc.) of the outer contact members (the first contact member 20a etc.).

Further, it is preferred that the ratio of the width Wt of the end portion 20t of the fifth contact member 20e to a width W of the sensor element 12 (Wt/W) is greater than or equal to 12.1% and less than or equal to 27.3%.

Now, an example of an experiment will be described. In the example of the experiment, gas sensors of examples 1 to 7 and gas sensors of comparative examples 1 to 3 were prepared and each gas sensor was subjected to heating and vibration testing to check for presence/absence of short-circuiting by means of signal monitoring and presence/absence of abnormalities of the contact members.

The heating and vibration testing was conducted under the following conditions, with each gas sensor attached to an exhaust pipe of a propane burner mounted to a vibration testing instrument.

Gas temperature: 900° C.
Vibration condition: 30-minute sweeping of 50 Hz→100 Hz→150 Hz→250 Hz
Acceleration: 30 G, 40 G, 50 G
Test time: 150 hours
[Judgment Method]

Judgment 1: Presence/absence of signal variation due to short-circuiting during the heating and vibration testing was checked. Criteria of judgment 1 were set as follows.

A: No variation of sensor signal (Ip2) due to short-circuiting was observed during the heating and vibration testing.

B: Variation of sensor signal (Ip2) due to short-circuiting was observed during the heating and vibration testing.

Judgment 2: Presence/absence of abnormalities of contact members after the heating and vibration testing was checked. Criteria of judgment 2 were set as follows.

A: No abnormality
B: Breakage of contact members

Example 1

The ratio of the width Wt of the end portion 20t of the fifth contact member 20e to the width (Wa, Wb, etc.) of the outer contact members (first contact member 20a etc.) is 90%.

The ratio of the width Wt of the end portion 20t of the fifth contact member 20e to the width W of the sensor element 12 is 27.3%

The width of the outer contact members is 1 mm and the width of the sensor element 12 is 3.3 mm; the same applies to the following examples.

Example 2

The ratio of the width Wt to the width of the outer contact members is 80% and the ratio of the width Wt to the width W of the sensor element 12 is 24.2%.

Example 3

The ratio of the width Wt to the width of the outer contact members is 70% and the ratio of the width Wt to the width W of the sensor element 12 is 21.2%.

Example 4

The ratio of the width Wt to the width of the outer contact members is 60% and the ratio of the width Wt to the width W of the sensor element 12 is 18.2%.

Example 5

The ratio of the width Wt to the width of the outer contact members is 50% and the ratio of the width Wt to the width W of the sensor element 12 is 15.2%.

Example 6

The ratio of the width Wt to the width of the outer contact members is 45% and the ratio of the width Wt to the width W of the sensor element 12 is 13.6%.

Example 7

The ratio of the width Wt to the width of the outer contact members is 40% and the ratio of the width Wt to the width W of the sensor element 12 is 12.1%.

Comparative Example 1

The ratio of the width Wt to the width of the outer contact members is 100% and the ratio of the width Wt to the width W of the sensor element 12 is 30.3%.

Comparative Example 2

The ratio of the width Wt to the width of the outer contact members is 35% and the ratio of the width Wt to the width W of the sensor element 12 is 10.6%.

Comparative Example 3

The ratio of the width Wt to the width of the outer contact members is 30% and the ratio of the width Wt to the width W of the sensor element 12 is 9.1%.

Table 1 of FIG. 4 shows the judgment results and details of examples 1 to 7 and comparative examples 1 to 3 above.

From the results shown in Table 1, it is preferred that the width Wt of the end portion 20t of the fifth contact member 20e is greater than or equal to 40% and less than or equal to 90% of the widths (Wa, Wb, etc.) of the outer contact members (the first contact member 20a etc.). Further, it is preferred that the ratio (Wt/W) of the width Wt of the end portion 20t of the fifth contact member 20e to the width W of the sensor element 12 is greater than or equal to 12.1% and less than or equal to 27.3%.

The embodiments described above can be summarized as follows.

[1] A gas sensor (10) according to the embodiment includes: a sensor element (12); a plurality of element pads (200a to 200e) formed on a rear end portion of the sensor element (12); and a plurality of contact members (20a to 20e) configured to hold the rear end portion of the sensor element (12) and be electrically connected respectively to the plurality of element pads (200a to 200e), wherein at least one contact member (20e) of the plurality of contact members (20a to 20e) has a smaller width (Wt) than the other contact members.

This enlarges the distance between adjacent contact members and hence contributes to preventing short-circuiting. Furthermore, the reduction in the width of contact member(s) reduces the amount of the material used to form the element pads (200a to 200e), e.g., Pt (platinum), leading to reduced costs.

[2] In the embodiment, among three or more contact members (20a to 20e), at least one contact member (20e) disposed in the middle has the smaller width (Wt).

Thus, when three or more contact members are provided, the width (Wt) of at least one contact member (20e) disposed in the middle is formed smaller, which enlarges the intervals (distance) between the adjacent contact members, and it is thus possible to prevent short-circuiting from occurring. Furthermore, the reduction in the width (Wt) of the contact member (20e) reduces the amount of the material used to form the element pad (200e), e.g., Pt (platinum), enabling cost reduction.

[3] In the embodiment, of three contact members (20a, 20e, 20b), one contact member (20e) disposed in the middle has the smaller width (Wt).

Thus, when three contact members (20a, 20e, 20b) are provided, the width (Wt) of one contact member (20e) disposed in the middle is formed smaller, which enlarges the intervals (distance) between the adjacent contact members and it is thus possible to prevent short-circuiting from occurring. Furthermore, the reduction in the width (Wt) of the contact member (20e) reduces the amount of the material used to form the element pad (200e), e.g., Pt (platinum), enabling cost reduction.

[4] In the embodiment, the smaller width (Wt) of the contact member (20e) is from 0.4 times to 0.9 times the width of the other contact members (20a to 20d). Setting the width (Wt) to be less than 0.4 times cannot keep durability of the contact member (20e), and setting the width (Wt) to be greater than 0.9 times is ineffective.

[5] In the embodiment, the smaller width (Wt) of the contact member (20e) is from 0.121 times to 0.273 times the width (W) of the sensor element (12). Setting the width (Wt) to be less than 0.121 times cannot keep durability of the contact member, and setting the width (Wt) to be greater than 0.273 times is ineffective.

Implementations of the present invention may be provided with various means to improve reliability as an automotive component without departing from the idea of the present invention.

The present invention is not particularly limited to the embodiment described above, and various modifications are possible without departing from the essence and gist of the present invention.

What is claimed is:

1. A gas sensor comprising:
    a sensor element;
    a plurality of element pads formed on a rear end portion of the sensor element; and
    a plurality of contact members configured to hold the rear end portion of the sensor element and be electrically connected respectively to the plurality of element pads,
    wherein, among three or more contact members of the plurality of contact members, at least one of the three or more contact members that is disposed in a middle has a smaller width than other contact members of the plurality of contact members,
    wherein the smaller width of the at least one contact member is from 0.4 times to 0.6 times a width of the other contact members, and
    wherein the smaller width of the at least one contact member is from 0.121 times to 0.273 times a width of the sensor element.

2. A gas sensor comprising,
    a sensor element;
    a plurality of element pads formed on a rear end portion of the sensor element; and
    a plurality of contact members configured to hold the rear end portion of the sensor element and be electrically connected respectively to the plurality of element pads,
    wherein at least one contact member of the plurality of contact members has a smaller width than other contact members of the plurality of contact members, and
    wherein the smaller width of the at least one contact member is from 0.121 times to 0.273 times a width of the sensor element.

* * * * *